(12) United States Patent
Kim et al.

(10) Patent No.: US 11,683,710 B2
(45) Date of Patent: Jun. 20, 2023

(54) METHOD AND APPARATUS FOR INTERFERENCE MEASUREMENT IN WIRELESS COMMUNICATION SYSTEM

(71) Applicant: SAMSUNG ELECTRONICS CO., LTD., Gyeonggi-do (KR)

(72) Inventors: Eunyong Kim, Gyeonggi-do (KR); Daeyoung Seol, Gyeonggi-do (KR)

(73) Assignee: Samsung Electronics Co., Ltd

( * ) Notice: Subject to any disclaimer, the term of this patent is extended or adjusted under 35 U.S.C. 154(b) by 82 days.

(21) Appl. No.: 16/973,621

(22) PCT Filed: Jun. 14, 2019

(86) PCT No.: PCT/KR2019/007209
§ 371 (c)(1),
(2) Date: Dec. 9, 2020

(87) PCT Pub. No.: WO2020/009348
PCT Pub. Date: Jan. 9, 2020

(65) Prior Publication Data
US 2021/0250796 A1  Aug. 12, 2021

(30) Foreign Application Priority Data
Jul. 5, 2018  (KR) ........................ 10-2018-0078224

(51) Int. Cl.
*H04W 24/10*  (2009.01)
*H04B 17/27*  (2015.01)
(Continued)

(52) U.S. Cl.
CPC ............ *H04W 24/10* (2013.01); *H04B 17/27* (2015.01); *H04B 17/345* (2015.01);
(Continued)

(58) Field of Classification Search
CPC ..... H04W 24/10; H04B 17/27; H04B 17/345; H04B 17/364; H04L 5/0048; H04L 5/0069
See application file for complete search history.

(56) References Cited

U.S. PATENT DOCUMENTS

2012/0327795 A1  12/2012  Malik et al.
2014/0119206 A1   5/2014  Vargantwar
(Continued)

FOREIGN PATENT DOCUMENTS

CN    102958092      3/2013
KR    1020140108785  9/2014
(Continued)

OTHER PUBLICATIONS

Intel Corporation, "Considerations on Reference Signal for Interference Management in Dynamic TDD", R1-1700388, 3GPP TSG RAN1 Wg Meeting NR AH 1701, Jan. 16-20, 2017, 6 pgs.
(Continued)

*Primary Examiner* — Duc C Ho
(74) *Attorney, Agent, or Firm* — The Farrell Law Firm, P.C.

(57) ABSTRACT

The present disclosure relates to a method for controlling interference measurement by an interference measurement control device, the method comprising the steps of: calculating distance information between a transmission side transmitting a reference signal for interference measurement and a reception side receiving the reference signal; calculating, on the basis of the distance information, signal delay information related to a delay time required until the reference signal transmitted from the transmission side arrives at the reception side; and determining control information for the transmission side or the reception side on the basis of the signal delay information.

16 Claims, 8 Drawing Sheets

(51) Int. Cl.
*H04B 17/345* (2015.01)
*H04B 17/364* (2015.01)
*H04L 5/00* (2006.01)

(52) U.S. Cl.
CPC ......... *H04B 17/364* (2015.01); *H04L 5/0048* (2013.01); *H04L 5/0069* (2013.01)

(56) References Cited

U.S. PATENT DOCUMENTS

| | | |
|---|---|---|
| 2014/0241273 A1 | 8/2014 | Kim et al. |
| 2014/0321314 A1 | 10/2014 | Fodor et al. |
| 2014/0341089 A1 | 11/2014 | Ji et al. |
| 2017/0163392 A1 | 6/2017 | Lim et al. |
| 2017/0280343 A1 | 9/2017 | Chu et al. |
| 2018/0139747 A1 | 5/2018 | Hosseini et al. |
| 2019/0342057 A1* | 11/2019 | Rico Alvarino .. H04W 72/0446 |
| 2020/0067612 A1* | 2/2020 | Wu ...................... H04L 1/0026 |

FOREIGN PATENT DOCUMENTS

| | | |
|---|---|---|
| KR | 101664876 | 10/2016 |
| KR | 1020170067453 | 6/2017 |
| WO | WO 01/18560 | 3/2001 |
| WO | WO 2017/165808 | 9/2017 |

OTHER PUBLICATIONS

European Search Report dated May 10, 2021 issued in counterpart application No. 19831150.8-1205, 9 pages.
PCT/ISA/210 Search Report issued on PCT/KR2019/007209, dated Sep. 19, 2019, pp. 5.
PCT/ISA/237 Written Opinion issued on PCT/KR2019/007209, dated Sep. 19, 2019, pp. 5.
Chinese Office Action dated Apr. 8, 2022 issued in counterpart application No. 201980043585.6, 15 pages.

* cited by examiner

METHOD AND APPARATUS FOR INTERFERENCE MEASUREMENT IN WIRELESS COMMUNICATION SYSTEM

PRIORITY

This application is a National Phase Entry of PCT International Application No. PCT/KR2019/007209, which was filed on Jun. 14, 2019, and claims priority to Korean Patent Application No. 10-2018-0078224, which was filed on Jul. 5, 2018, the contents of each of which are incorporated herein by reference.

TECHNICAL FIELD

The present disclosure relates to a method and apparatus for measuring interference in a wireless communication system, and more particularly, to a method and apparatus for improving interference measurement performance in a wireless communication system.

BACKGROUND ART

To satisfy demands for wireless data traffic having increased since commercialization of $4^{th}$-Generation (4G) communication systems, efforts have been made to develop improved $5^{th}$-Generation (5G) communication systems or pre-5G communication systems. For this reason, the 5G communication system or the pre-5G communication system is also called a beyond-4G-network communication system or a post-Long Term Evolution (LTE) system.

It is considered that the 5G communication system will be implemented in millimeter wave (mmWave) bands, e.g., 60 GHz bands, so as to accomplish higher data rates. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud Radio Access Network (RAN), an ultra-dense network, a Device to Device (D2D) communication, a wireless backhaul, a moving network, cooperative communication, Coordinated Multi-Points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

Technique development for satisfying main performance indexes of enhanced mobile broadband (eMBB), ultra-reliable low latency communication (URLLC), and massive machine type communication (mMTC) as main use scenarios of 5G new radio (NR) have been performed.

An ultra-high frequency (millimeter wave (mmWave)) band used in 5G systems undergoes a relatively high path-loss in a radio channel because of using a higher carrier frequency band than a carrier frequency of 6 GHz or less used in an existing cellular wireless communication system.

To supplement a loss in the radio channel, a beamforming technique may be introduced in mmWave, in which an antenna array including a greater number of antenna elements is used and an appropriate beamforming weight is applied to each antenna element, thereby transmitting or receiving a high output in a particular direction.

FIG. 1 illustrates a schematic structure of a beamforming-based cellular wireless communication system.

The beamforming-based cellular wireless communication system illustrated in FIG. 1 may include a base station 110 and one or more terminals 120 and 130.

The first terminal 120 and the second terminal 130 of FIG. 1 are included in one serving cell. The base station 110 corresponds to a serving cell base station of the first terminal 120 and the second terminal 130.

In FIG. 1, the base station 110 may transmit a signal through a first beam 125 for the first terminal 120 and transmit a signal through a second beam 135 for the second terminal 130.

As illustrated in FIG. 1, in a beamforming-based cellular wireless communication system, even for terminals included in the same cell, a signal may be transmitted and received using different beams according to a location of each terminal.

DETAILED DESCRIPTION OF THE INVENTION

Technical Problem

According to an embodiment of the present disclosure, there is provided a method and apparatus for improving the accuracy of inter-cell interference measurement in a wireless communication system.

In particular, according to an embodiment of the present disclosure, a signal delay with respect to a reference signal between a transmission side and a reception side may be predicted based on location coordinates of the transmission side and the reception side to improve the accuracy of interference measurement, thereby allowing efficient radio resource management.

According to an embodiment of the present disclosure, by estimating a location of a terminal through beam information and timing advance (TA) information to improve the accuracy of inter-cell interference measurement, thereby enabling efficient radio resource management.

Moreover, according to an embodiment of the present disclosure, interference measurement among multiple base stations may be performed simultaneously, making efficient interference measurement possible.

Technical Solution

A method for controlling interference measurement by an interference measurement control device according to the present disclosure includes calculating distance information between a transmission side that transmits a reference signal (RS) for interference measurement and a reception side that receives the RS, calculating signal delay information related to a delay time taken for the RS signal transmitted from the transmission side to arrive at the reception side, based on the distance information, and determining control information regarding the transmission side or the reception side based on the signal delay time.

The method according to the present disclosure further includes determining RS allocation information, in which the RS allocation information includes one or more information among information about the transmission side that transmits the RS for interference measurement, information about the reception side that receives the RS, transmission time information of the RS, and transmission direction information of the RS.

According to the present disclosure, the distance information is calculated based on location information of the transmission side and location information of the reception side.

According to the present disclosure, when the transmission side or the reception side is a base station, the location information of the transmission side or the location information of the reception side is calculated by calculating location information of the base station from previously stored location coordinates data or receiving location coordinates of the base station from the base station.

According to the present disclosure, when the transmission side or the reception side is a terminal, the location information of the transmission side or the location information of the reception side is calculated based on at least one of global positioning system (GPS) information for the terminal, a positioning RS, beam information, timing advance (TA) information, or TA information of neighboring cells.

According to the present disclosure, the signal delay information is calculated based on uplink (UL) TA information of the transmission side.

The method according to the present disclosure further includes transmitting the control information to the transmission side or the reception side.

According to the present disclosure, the control information includes information about a transmission time of the RS transmitted from the transmission side or information about a measurement window of the reception side.

A method for performing interference measurement by a base station according to the present disclosure includes calculating distance information between a transmission side that transmits a reference signal (RS) for interference measurement and the base station that receives the RS, calculating signal delay information related to a delay time taken for the RS signal transmitted from the transmission side to arrive at the base station, based on the distance information, determining control information regarding the transmission side or the base station based on the signal delay time, receiving the RS from the transmission side, and performing interference measurement by measuring the received RS based on the control information.

According to the present disclosure, the method further includes receiving transmission time information of the RS and location coordinates of the transmission side, which are transmitted from the transmission side, in which the RS is simultaneously transmitted from the transmission side to a plurality of reception sides including the base station.

A method for performing interference measurement by a terminal according to the present disclosure includes receiving control information, receiving the RS from a transmission side, performing interference measurement by measuring the received RS based on the control information, and transmitting a result of the performed interference measurement, in which the control information is determined based on delay information related to a delay time taken for the RS signal transmitted from the transmission side to arrive at the base station, and the signal delay information is calculated based on distance information between the transmission side and the terminal.

An interference measurement control device according to the present disclosure includes a transceiver and a processor configured to calculate distance information between a transmission side that transmits a reference signal (RS) for interference measurement and a reception side that receives the RS, calculate signal delay information related to a delay time taken for the RS signal transmitted from the transmission side to arrive at the reception side, based on the distance information, and determine control information regarding the transmission side or the reception side based on the signal delay time.

A base station according to the present disclosure includes a transceiver and a processor configured to calculate distance information between a transmission side that transmits a reference signal (RS) for interference measurement and the base station that receives the RS, calculate signal delay information related to a delay time taken for the RS signal transmitted from the transmission side to arrive at the base station, based on the distance information, determine control information regarding the transmission side or the base station based on the signal delay time, receive the RS from the transmission side, and perform interference measurement by measuring the received RS based on the control information.

A terminal according to the present disclosure includes a transceiver and a processor configured to receive control information, receive the RS from a transmission side, perform interference measurement by measuring the received RS based on the control information, and transmit a result of the performed interference measurement, in which the control information is determined based on delay information related to a delay time taken for the RS signal transmitted from the transmission side to arrive at the base station, and the signal delay information is calculated based on distance information between the transmission side and the terminal.

Advantageous Effects

According to an embodiment of the present disclosure, a signal delay with respect to a reference signal between a transmission side and a reception side may be predicted based on location coordinates of the transmission side and the reception side, thereby improving the accuracy of interference measurement.

According to an embodiment of the present disclosure, by estimating a location of a terminal through beam information and timing advance (TA) information, thereby improving the accuracy of inter-cell interference measurement.

Moreover, according to an embodiment of the present disclosure, interference measurement among multiple base stations may be performed simultaneously, enabling efficient interference measurement.

MODE FOR CARRYING OUT THE INVENTION

Hereinafter, embodiments of the present disclosure are described in detail with reference to the accompanying drawings. In the following description of the disclosure, a detailed description of well-known functions or elements associated with the present disclosure will be omitted if it unnecessarily obscures the subject matter of the disclosure. The terms as used herein are defined considering the functions in the present disclosure and may be replaced with other terms according to the intention or practice of the user or operator. Therefore, the terms should be defined based on the overall disclosure.

Before detailing the present disclosure, some terms as used herein may be interpreted as follows, for example. However, it should be noted that the present disclosure is not limited thereto.

A user equipment (UE) is an entity that communicates with another terminal or a base station, and may also be referred to as a UE, a mobile station (MS), a mobile equipment (ME), a device, a terminal, or the like. In the present specification, the terminal may include an Internet of Things (IoT) terminal, a fast driving vehicle, or a terminal mounted on the vehicle.

The base station is an entity communicating with a UE and may be denoted as a BS, a NodeB (NB), an eNodeB (eNB), or an access point (AP).

Interference between cells may be one of causes for degradation in communication performance in a cellular wireless communication system.

To improve communication performance and efficiently use radio resources, inter-cell interference needs to be predicted in advance, thereby avoiding inter-cell interference.

Hereinbelow, a description will be made of occurrence of inter-cell interference with reference to FIG. 2.

Figure 1:
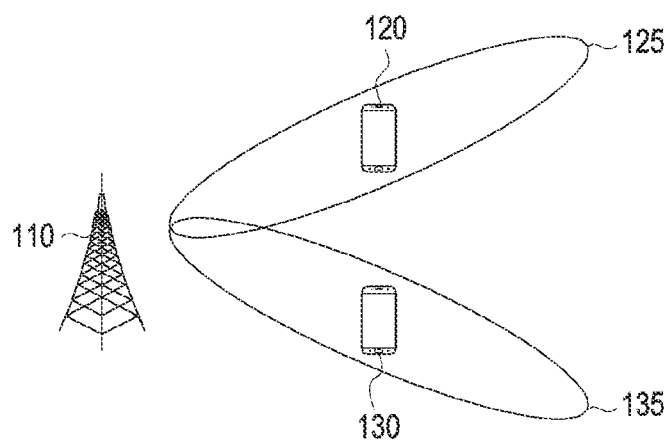
FIG. 1 illustrates a schematic structure of a beamforming-based cellular wireless communication system.
Figure 2:
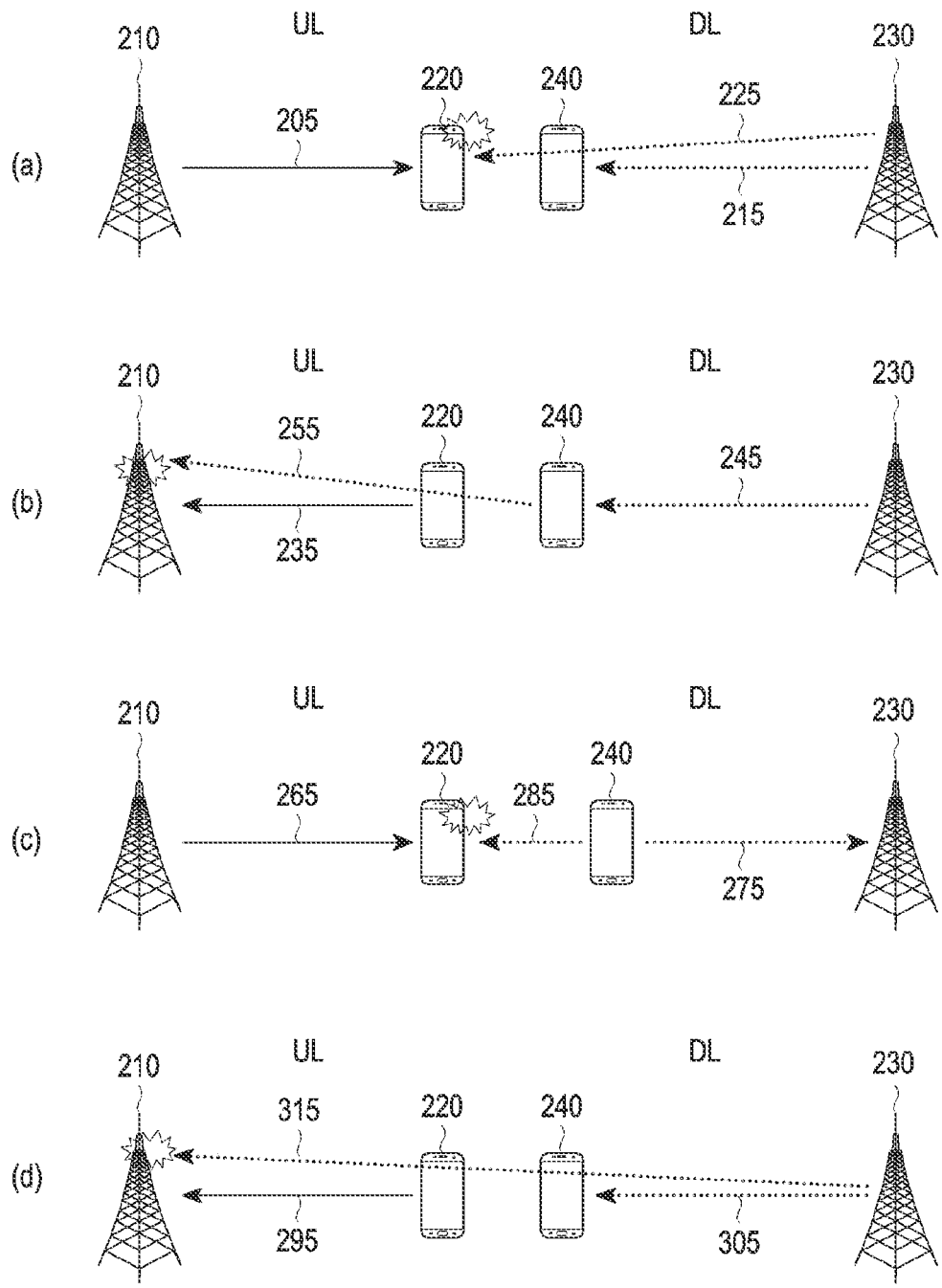
FIG. 2 illustrates examples where inter-cell interference occurs in signal transmission and reception between one or more base stations and one or more terminals.

FIG. 2 illustrates examples where inter-cell interference occurs in signal transmission and reception between one or more base stations and one or more terminals.

FIG. 2 illustrates a first base station 210, a first terminal 220 that transmits and receives a signal to and from the first base station 210, a second base station 230, and a second terminal 240 that transmits and receives a signal to and from the second base station 230.

FIG. 2(a) illustrates a case where a downlink (DL) signal of a base station interferes with a DL signal of another base station.

Referring to FIG. 2(a), the first base station 210 may transmit a first DL signal 205 to the first terminal 220, and the second base station 230 may transmit a second DL signal 215 to the second terminal 240.

In this case, the second DL signal 215 transmitted from the second base station 230 to the second terminal 240 may affect the first terminal 220, thus acting as a first interference signal 225.

That is, the first interference signal 225 transmitted from the second base station 230 may interfere with the first DL signal 205.

FIG. 2(b) illustrates a case where an uplink (UL) signal of a terminal interferes with an UL signal of another terminal.

Referring to FIG. 2(b), the first terminal 220 may transmit a first UL signal 235 to the first base station 210, and the second terminal 240 may transmit a second UL signal 245 to the second base station 230.

In this case, the second UL signal 245 transmitted from the second terminal 240 to the second base station 230 may affect the first base station 210, thus acting as a second interference signal 255.

That is, the second interference signal 255 transmitted from the second terminal 240 may interfere with the first UL signal 235.

FIG. 2(c) illustrates a case where interference occurs between different terminals.

Referring to FIG. 2(c), it may be assumed that the first base station 210 may transmit a first DL signal 265 to the first terminal 220 and the second terminal 240 may transmit a second UL signal 275 to the second base station 230.

In this case, the second UL signal 275 transmitted from the second terminal 240 to the second base station 230 may affect the first terminal 220, thus acting as a third interference signal 285.

That is, the third interference signal 285 transmitted from the second terminal 240 may interfere with the first DL signal 265.

FIG. 2(d) illustrates a case where interference occurs between different base stations.

Referring to FIG. 2(d), it may be assumed that the first terminal 220 may transmit a first UL signal 295 to the first base station 210 and the second base station 230 may transmit a second DL signal 305 to the second terminal 240.

In this case, the second DL signal 305 transmitted from the second base station 230 to the second terminal 240 may affect the first base station 210, thus acting as a fourth interference signal 315.

That is, the fourth interference signal 315 transmitted from the second base station 230 may interfere with the first UL signal 295.

As shown in FIG. 2, as a cause for inter-cell interference, interference between a base station and a terminal, interference between different terminals, or interference between different base stations may be included.

To avoid inter-cell interference, inter-cell interference information, e.g., interference information between a base station and a terminal, interference information between terminals, or interference information between base stations may be required.

For example, data may be transmitted by selecting a combination of terminals having small inter-cell interference or selecting a transmission direction of a signal which has small inter-cell interference for DL or UL transmission for each cell, based on the inter-cell interference information. In a beamforming-based communication system, selection of a terminal may mean selection of a beam for transmission or reception to or from the terminal.

The inter-cell interference information may be generated as a transmission side (e.g., a base station or a terminal) transmits a reference signal (RS) of a preset sequence in a preset time and a reception side (e.g., a base station or a terminal) receives the RS to measure a strength of the RS.

The preset time and the preset sequence for transmitting the RS may be information that is pre-agreed between the transmission side and the reception side.

Meanwhile, to measure the inter-cell interference information, a synchronization error may occur between the transmission side and the reception side.

When a signal is transmitted or received in one cell, the transmission side and the reception side may operate in synchronization with each other, thereby performing measurement of the signal without degradation in performance due to a synchronization error.

On the other hand, when inter-cell interference is measured, the transmission side transmitting an RS for interference measurement and the reception side receiving the RS are present in different cells, resulting in a synchronization error in transmission or reception of the RS in the transmission side and the reception side.

Hereinbelow, with reference to FIG. 3, a detailed description will be made of a synchronization error that is likely to occur in inter-cell interference measurement.

Figure 3:
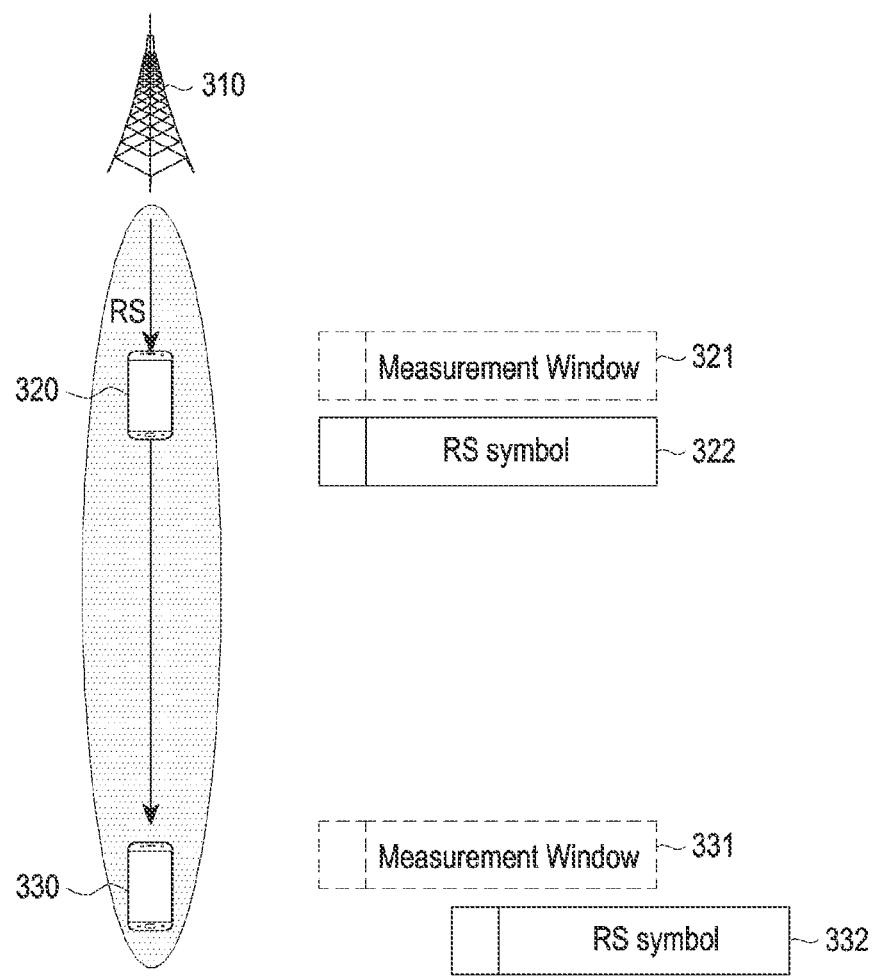
FIG. 3 schematically illustrates a delay of a reference signal with respect to a distance.

FIG. 3 schematically illustrates a delay of a reference signal with respect to a distance.

FIG. 3 illustrates a case where an RS transmitted from a base station 310 is measured by a first terminal 320 and a second terminal 330, respectively.

The first terminal 320 is located in a short distance from the base station 310, and the second terminal 330 is located in a long distance from the base station 310 when compared to the first terminal 320.

Referring to FIG. 3, the first terminal 320 located in a relatively short distance from the base station 310 may relatively accurately measure an RS symbol 322 in a measurement window 321 of the first terminal 320 because the RS is hardly delayed.

However, the second terminal 330 is located in a relatively long distance from the base station 310, such that a delay may occur in arrival of the RS transmitted from the base station 310, at the second terminal 330.

As described above, as a delay occurs at reception of the RS, an RS symbol 332 of the RS received in the second terminal 330 may not be accurately measured in the measurement window 331 of the second terminal 330.

That is, as illustrated in FIG. 3, as a distance between a transmission side (e.g., the base station of FIG. 3) and a reception side (e.g., the second terminal of FIG. 3) increases, a delay in reception of the RS increases, such that RS symbol measurement in a measurement window of the reception side may not be accurately performed.

Thus, when the distance between the transmission side and the reception side is long, an accurate interference signal may not be derived from inter-cell interference information measured in the reception side.

As illustrated in FIG. 3, as the distance between the transmission side and the reception side increases, a synchronization error increases in reception of an RS signal transmitted in the transmission side (e.g., the base station of FIG. 3) at the reception side (e.g., the second terminal of FIG. 3).

Due to occurrence of the synchronization error, the RS received in the reception side (e.g., the second terminal of FIG. 3) may not be correctly measured in the measurement window of the reception side. Thus, a strength of an RS measured in the reception side is measured less than a strength of an RS transmitted in the transmission side, degrading the accuracy of inter-cell interference.

In particular, in a high carrier frequency like the ultra-high frequency (mmWave) band, due to a short orthogonal frequency division multiplexing (OFDM) symbol length, an RS symbol out of the measurement window range of the reception side may increase in case of occurrence of a signal delay. As a result, in an mmWave-band communication system, the accuracy of measurement of a strength of an RS may be further degraded due to an influence of a synchronization error.

As the accuracy of measurement of a strength of an RS is degraded, the accuracy of inter-cell interference measurement is reduced, such that utilization of inter-cell interference information may have a negative influence upon communication performance improvement. Thus, there is a need for a scheme to improve the accuracy of inter-cell interference measurement.

According to an embodiment of the present disclosure, by reflecting a synchronization error between the transmission side and the reception side, an inter-cell interference signal may be measured.

Interference signal measurement according to an embodiment may predict a signal delay by calculating distance information between a transmission side and a reception side, and measure inter-cell interference based on the signal delay.

Figure 4:
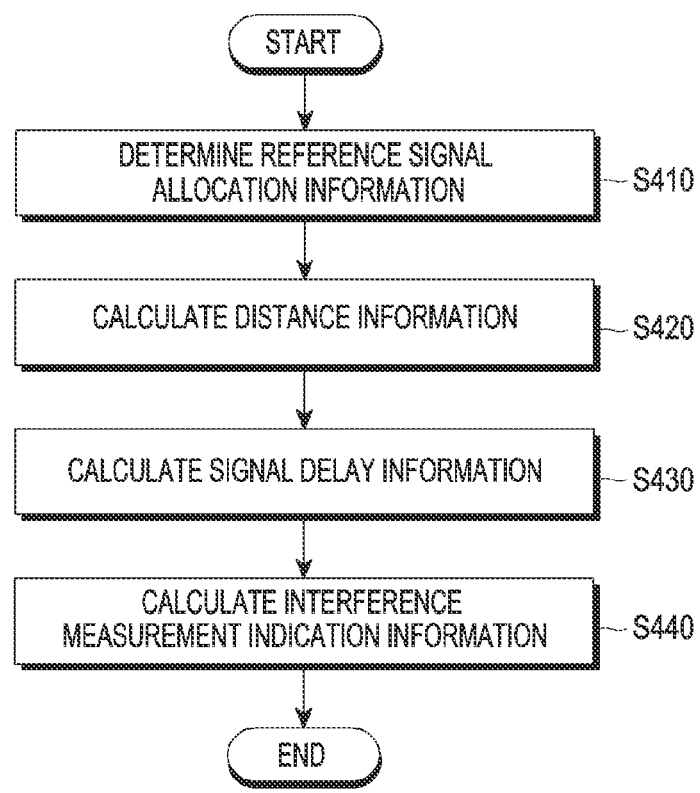
FIG. 4 is a flowchart illustrating a method of measuring interference by reflecting signal delay information, according to an embodiment of the present disclosure.

FIG. 4 is a flowchart illustrating a method of measuring interference by reflecting signal delay information, according to an embodiment of the present disclosure.

Each operation illustrated in FIG. 4 may be performed by an interference measurement control device according to an embodiment of the present disclosure. The interference measurement control device according to an embodiment may be a device for controlling one or more operations performed by a transmission side (a base station or a terminal) that transmits an RS for interference measurement or a reception side (a base station or a terminal) that receives the RS.

According to an embodiment of the present disclosure, the interference measurement control device may be configured as a separate device from the base station or the terminal that transmits or receives the RS.

According to another embodiment of the present disclosure, the interference measurement control device may be a base station device that transmits or receives the RS.

According to an embodiment of the present disclosure, the interference measurement control device may determine RS allocation information for interference measurement in operation S410.

The RS allocation information according to an embodiment may include information about a transmission side that transmits an RS for interference measurement, information about a reception side that receives the RS, transmission time information of the RS for allocation to the transmission side or the reception side, transmission direction information of the RS, beam information, etc.

According to an embodiment of the present disclosure, when the RS allocation information includes the beam information and the transmission direction information of the RS, a beam type and an RS transmission direction corresponding to the smallest interference may be induced by measuring interference corresponding to each beam type or each transmission direction.

While it is illustrated in FIG. 4 that the interference measurement control device determines the RS allocation information, operation S410 may be skipped.

According to another embodiment of the present disclosure, the interference measurement control device may receive the RS allocation information from another device.

In operation S420, distance information between the transmission side and the reception side may be calculated based on transmission-side information and reception-side information determined in operation S410.

The distance information according to an embodiment may be obtained by calculating location information of the transmission side and location information of the reception side.

For example, when the transmission side or the reception side is a base station, location information of the base station may be obtained from previously stored location coordinate data of the base station, and may also be obtained as location coordinates of the base station are received from the base station.

In another example, when the transmission side or the reception side is a terminal, location information of the terminal may be obtained by calculating location coordinates of the terminal based on at least one of global positioning system (GPS) information, a positioning RS, beam information, timing advance (TA) information, or TA information of neighboring cells.

The TA information is time information that means by how much time an UL signal has to be transmitted in advance of transmission of a DL signal to the terminal, and may be a value increasing in proportion to a distance of the terminal from a serving cell base station.

The serving cell base station may deduce an azimuth of a location of the terminal with respect to the base station, through beam information transmitted or received from the terminal. The serving cell base station may calculate a distance of the terminal from the base station through the TA information regarding the terminal. The location coordinates of the terminal may be determined based on the calculated location angle of the terminal and the distance of the terminal from the base station.

According to an embodiment, the serving cell base station may store terminal-specific real-time beam information and real-time TA information for terminals belonging to a cell.

The location coordinates of the terminal according to an embodiment may be deduced by being received from the serving cell base station of the terminal.

According to another embodiment of the present disclosure, the location information of the terminal may be deduced by receiving GPS information.

According to an embodiment of the present disclosure, signal delay information may be calculated based on the RS allocation information determined in operation S410 and the distance information calculated in operation S420, in operation S430.

The signal delay information according to an embodiment may mean a delay time taken from transmission of the RS from the transmission side to arrival of the RS at the reception side.

For example, when both the transmission side and the reception side are base stations, that is, for signal delay information between base stations, an absolute distance between the transmission side and the reception side may be divided by the speed of light to calculate the signal delay information.

Meanwhile, when the transmission side is a terminal, a UL TA time of a transmission terminal may be reflected to calculate the signal delay information.

According to an embodiment, in operation S440, interference measurement indication information may be calculated based on the signal delay information calculated in operation S430.

The interference measurement indication information according to an embodiment of the present disclosure may indicate information for indication to the transmission side or the reception side for interference measurement.

For example, the interference measurement indication information according to an embodiment of the present disclosure may include RS transmission time modification information of the transmission side or measurement window modification information of the reception side.

The method of measuring interference based on a signal delay according to an embodiment of the present disclosure may be performed by an RS transmission time of the transmission side or measurement window modification of the reception side.

As described above with reference to FIG. 3, as a distance between the transmission side and the reception side increases, arrival of an RS may be delayed, such that an RS symbol may not be accurately measured within a measurement window of the reception side.

Thus, interference measurement according to an embodiment of the present disclosure may calculate delay information of the RS and reflect the delay information in RS transmission, enabling accurate measurement of the RS symbol within the measurement window of the reception side.

That is, according to an embodiment of the present disclosure, by modifying a transmission time of an RS transmitted from the transmission side based on the signal delay information, the RS may be measured within the measurement window of the reception side upon arrival of the RS at the reception side.

As described above, when interference measurement is performed by modifying an RS transmission time of the transmission side, the interference measurement indication information of S440 may include RS transmission time modification information of the transmission side.

The interference measurement control device according to another embodiment of the present disclosure may modify the measurement window of the reception side by considering the signal delay information, making it possible to accurately perform measurement upon arrival of the RS at the reception side.

When interference measurement is performed by modifying the measurement window of the reception side, the interference measurement indication information of operation S440 may include the measurement window modification information of the reception side.

As discussed above, according to an embodiment of the present disclosure, the base station may correspond to a device that is identical to the interference measurement control device, and when the transmission base station is the interference measurement control device, the transmission base station may perform operations S410 through S440.

In this case, after S440, the transmission base station may transmit an RS for interference measurement to the reception side (the base station or the terminal).

In addition, the transmission base station according to an embodiment may receive an interference measurement result from the reception side.

Figure 5:
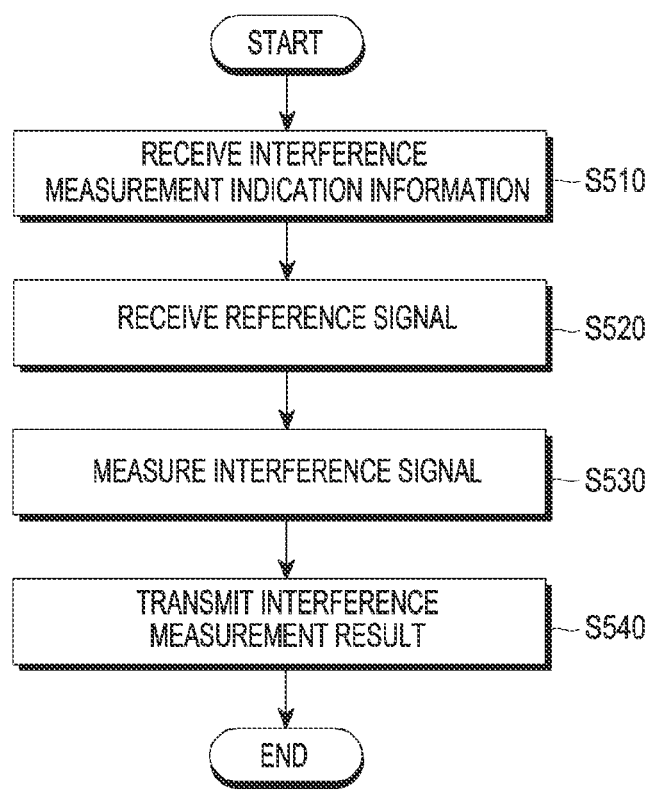
FIG. 5 is a flowchart illustrating a method of performing interference measurement in a terminal when a reception side of a reference signal is the terminal, according to an embodiment of the present disclosure.

FIG. 5 is a flowchart illustrating a method of performing interference measurement in a terminal when a reception side of a reference signal is the terminal, according to an embodiment of the present disclosure.

According to an embodiment, in interference measurement between the base station and the terminal or interference measurement between different terminals, the terminal may receive an RS of the transmission side (which may be the base station or the terminal), thus performing interference measurement.

The terminal may receive interference measurement indication information from the interference measurement control device in operation S510.

The interference measurement indication information is information calculated based on the signal delay information of the RS, and thus may include the measurement window modification information of the reception side or the RS transmission time modification information of the transmission side, as described above with reference to FIG. 4.

Moreover, as described above with reference to FIG. 4, the interference measurement control device may be a device that is identical to the base station, and may be a separate device for controlling interference measurement according to an embodiment of the present disclosure.

According to an embodiment, the interference measurement indication information may be calculated based on the signal delay information of the RS arriving at the terminal.

A detailed description of the signal delay information is as described above with reference to FIG. 4.

The reception terminal according to an embodiment may receive the signal delay information together with the interference measurement indication information in operation S510.

According to an embodiment of the present disclosure, in operation S520, the reception terminal may receive an RS from the transmission side.

When the interference measurement indication information according to an embodiment of the present disclosure includes the RS transmission time modification information of the transmission side, the transmission side may transmit a transmission signal of the RS signal based on the RS transmission time modification information.

The terminal having received the RS in operation S520 may perform interference signal measurement from the received RS in operation S530.

The reception terminal may perform interference signal measurement by measuring a magnitude of the received RS through a signal measurement window.

When the interference measurement indication information according to an embodiment includes the RS transmission time modification information of the transmission side, the reception terminal may perform interference signal measurement by measuring the RS transmitted based on the RS transmission time information.

According to another embodiment of the present disclosure, when the interference measurement indication information includes measurement window modification information of the reception side, the reception terminal may measure the magnitude of the received RS by modifying the measurement window of the terminal.

That is, according to an embodiment of the present disclosure, through RS transmission time modification of the transmission side or measurement window modification of the reception side, a time offset of the RS, caused by the signal delay, may be compensated for, thereby accurately measuring the RS.

Moreover, according to an embodiment of the present disclosure, through RS transmission time modification of the transmission side or measurement window modification of the reception side, a time offset of the RS, caused by the signal delay, may be compensated for, thereby compensating for the magnitude of the RS reduced by the time offset.

The terminal may transmit an interference measurement result measured in operation S530, and the terminal according to an embodiment may transmit the interference measurement result to the interference measurement control device or the base station in operation S540.

Figure 6:
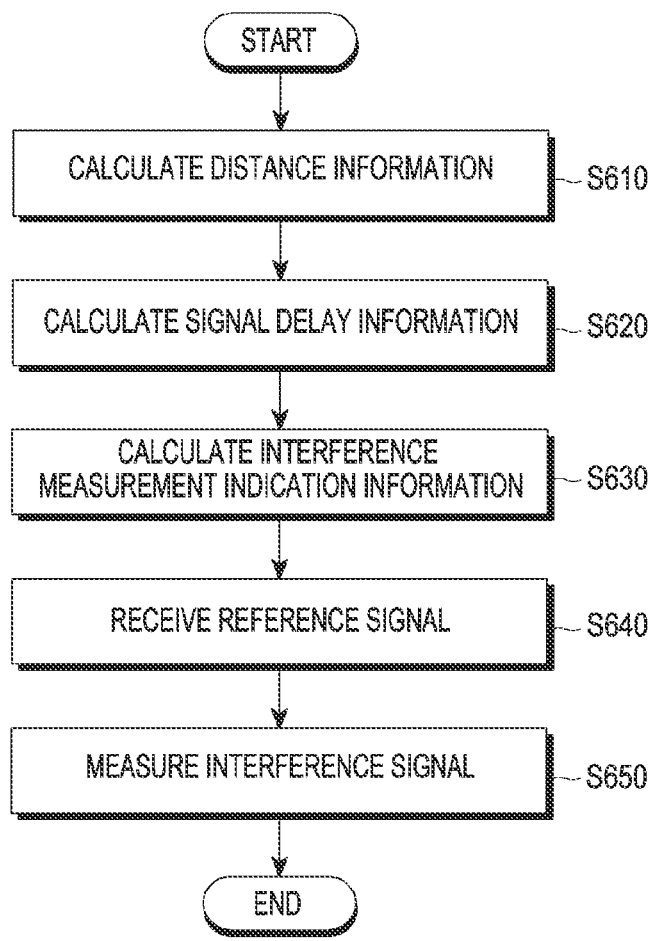
FIG. 6 is a flowchart illustrating a method of performing interference measurement in a base station when a reception side of a reference signal is the base station, according to an embodiment of the present disclosure.

FIG. 6 is a flowchart illustrating a method of performing interference measurement in a base station when a reception side of a reference signal is the base station, according to an embodiment of the present disclosure.

According to an embodiment, in interference measurement between the base station and the terminal or interference measurement between different base stations, the base station may receive an RS of the transmission side (which may be the base station or the terminal), thus performing interference measurement.

FIG. 6 shows a case where the base station, which is the reception side according to an embodiment, is a device that is identical to the interference measurement control device.

The base station according to an embodiment may determine RS allocation information for interference measurement. A detailed description of the RS allocation information is as described above with reference to FIG. 4.

The base station according to another embodiment may receive RS allocation information from a separate device as will be described below with reference to FIG. 7.

Referring to FIG. 6, the base station may calculate distance information between the transmission side and the reception side based on location information of the transmission side in operation S610.

According to an embodiment of the present disclosure, when the transmission side is a terminal, location information of the transmission terminal may be calculated through beam information and TA information, as described above with reference to FIG. 4.

The base station according to an embodiment may receive location information of the transmission terminal from a serving cell base station.

The reception base station according to another embodiment may calculate the location information of the transmission terminal from the GPS information.

According to an embodiment of the present disclosure, when the transmission side corresponds to a base station, the reception base station may use previously stored location information of the transmission side or may receive the location information of the transmission base station from the transmission base station.

According to an embodiment, the reception base station may calculate signal delay information based on the distance information calculated in operation S610, in operation S620, and may calculate the interference measurement indication information based on the signal delay information in operation S630.

The signal delay information of operation S620 and the interference measurement indication information of operation S630 may be as described above in operations S430 and S440 of FIG. 4.

The reception base station according to an embodiment of the present disclosure may receive the RS from the transmission side in operation S640.

When the interference measurement indication information according to an embodiment of the present disclosure includes the RS transmission time modification information of the transmission side, the transmission side may transmit a transmission signal of the RS signal based on the RS transmission time modification information.

The base station having received the RS in operation S640 may perform interference signal measurement from the received RS in operation S650.

When the interference measurement indication information according to an embodiment includes the measurement window modification information of the reception side, the reception base station may measure the magnitude of the received RS based on the measurement window modification information.

According to an embodiment of the present disclosure, in interference measurement between base stations, interference measurement between one transmission base station and a plurality of reception base stations may not be separately performed for each of the plurality of reception base stations, and the transmission base station may simultaneously transmit one RS to the plurality of reception base stations, such that the plurality of reception base stations may perform interference measurement at the same time.

Figure 7:
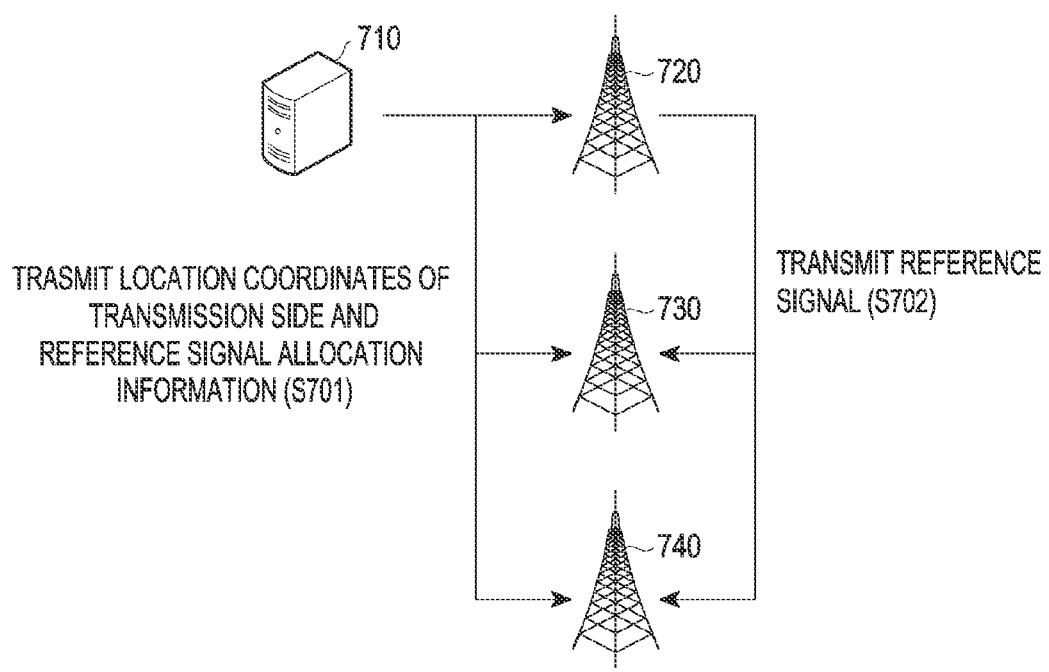
FIG. 7 schematically illustrates a method of measuring interference between base stations, according to an embodiment of the present disclosure.

FIG. 7 schematically illustrates a method of measuring interference between base stations, according to an embodiment of the present disclosure.

Referring to FIG. 7, interference measurement among base stations 720, 730, and 740 according to an embodiment of the present disclosure may be controlled by an interference measurement control device 710.

The interference measurement control device 710 according to an embodiment may be a device for controlling one or more operations performed by a transmission side that transmits an RS for interference measurement or a reception side that receives the RS.

FIG. 7 shows a case where a first base station 720 is a transmission side which is a transmission base station and a second base station 730 and a third base station 740 are reception sides which are reception base stations.

While it is illustrated in FIG. 7 for convenience of a description that the interference measurement control device 710 is a separate device, the interference measurement control device 710 may be a device that is identical to one of the first base station 720, the second base station 730, and the third base station 740 according to another embodiment of the present disclosure.

According to another embodiment of the present disclosure, the interference measurement control device 710 may be a random base station that is different from the first base station 720, the second base station 730, and the third base station 740.

The interference measurement control device 710 according to an embodiment may transmit RS allocation information to the base stations 720, 730, and 740, and transmit location coordinates of the transmission side, i.e., the first base station 720, to the second base station 730 and the third base station 740 in operation S701.

Thereafter, the first base station 720 may transmit an RS to the second base station 730 and the third base station 740 based on the RS allocation information in operation S702.

According to an embodiment of the present disclosure, the second base station 730 and the third base station 740 having received the RS may calculate distance information and signal delay information based on the location coordinates of the first base station 720 received in operation S701, and may perform interference measurement based on the calculated signal delay information.

According to another embodiment of the present disclosure, the interference measurement control device 710 may calculate distance information between a transmission base station (e.g., the first base station 720) and a reception base station (e.g., the second base station 730 or the third base station 740) and may calculate signal delay information and interference measurement indication information based on the distance information.

In this case, the interference measurement control device 710 may additionally transmit one or more information of the calculated distance information, signal delay information, or interference measurement indication information to each base station. The reception base station (e.g., the second base station or the third base station) having received the interference measurement indication information from the interference measurement control device 710 may measure an RS received from the transmission base station (e.g., the first base station) based on the respectively received interference measurement indication information, thereby performing interference measurement in each reception base station.

As shown in FIG. 7, through control of the interference measurement control device 710 according to an embodiment of the present disclosure, by simultaneously transmitting one RS to a plurality of different reception base stations, distance information, signal delay information, and interference measurement indication information may be calculated, respectively, for each reception side, enabling interference measurement for the plurality of reception base stations merely with single RS transmission.

When a DL signal of one transmission base station (e.g., the first base station 720) acts as interference with an UL for the plurality of reception base stations (e.g., the second base station 730 and the third base station 740), it may be more efficient for the plurality of reception base stations (e.g., the second base station 730 and the third base station 740) to simultaneously perform interference measurement than for the base stations to perform interference measurement one-to-one.

As described above with reference to FIGS. 4 through 7, as interference measurement according to an embodiment of the present disclosure is performed, accurate measurement of an interference signal is possible, thereby improving the efficiency of interference cancellation in signal transmission or reception.

Figure 8:
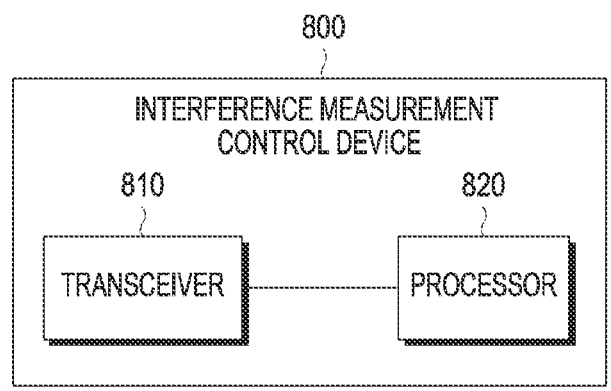
FIG. 8 is a block diagram of an interference measurement control device according to an embodiment of the present disclosure.

FIG. 8 is a block diagram of an interference measurement control device 800 according to an embodiment of the present disclosure.

The interference measurement control device 800 shown in FIG. 8 may be constructed as a base station device or a separate device.

The interference measurement control device 800 may include a transceiver 810 for performing signal transmission to and reception from the base station or the terminal and a processor 820 for controlling all operations of the interference measurement control device 800. All schemes or methods performed by the interference measurement control device described in the present disclosure may be understood as being performed by control of the processor 820. However, it will be apparent that the processor 820 and the transceiver 810 should not be necessarily implemented as separate devices, and may be implemented as one component in the form of, for example, a single chip.

Figure 9:
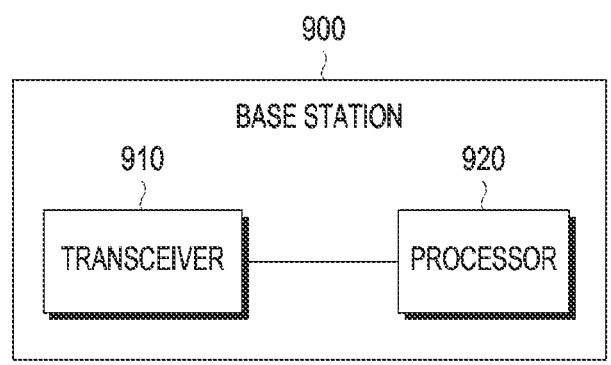
FIG. 9 is a block diagram of a base station according to an embodiment of the present disclosure.

FIG. 9 is a block diagram of a base station 900 according to an embodiment of the present disclosure.

The base station 900 shown in FIG. 9 may include a transceiver 900 for performing signal transmission to and reception from another base station or a terminal and a processor 920 for controlling all operations of the base station 900. All schemes or methods performed by the interference measurement control device described in the present disclosure may be understood as being performed by control of the processor 920. However, it will be apparent that the processor 920 and the transceiver 910 should not be necessarily implemented as separate devices, and may be implemented as one component in the form of, for example, a single chip.

Figure 10:
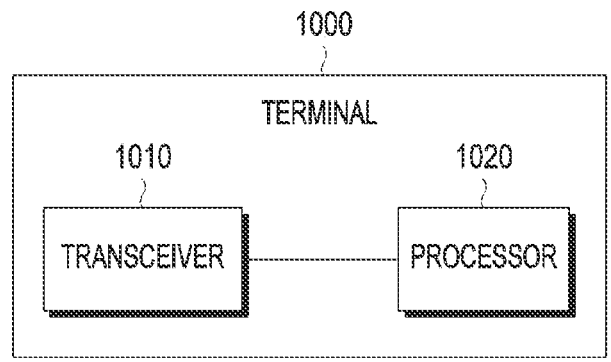
FIG. 10 is a block diagram of a terminal according to an embodiment of the present disclosure.

FIG. 10 is a block diagram of a terminal 1000 according to an embodiment of the present disclosure.

The terminal 1000 shown in FIG. 10 may include any communicable terminals including a vehicle terminal, an IoT terminal, or a consumer IoT (CIoT) terminal.

The terminal 1000 may include a transceiver 1010 for performing signal transmission to and reception from a base station or another terminal and a processor 1020 for controlling all operations of the terminal 1000. All schemes or methods performed by the terminal described in the present disclosure may be understood as being performed by control of the processor 1020. However, it will be apparent that the processor 1020 and the transceiver 1010 should not be necessarily implemented as separate devices, and may be implemented as one component in the form of, for example, a single chip.

It should be noted that an exemplary diagram of a method, a structural diagram of a system, and a structural diagram of a device shown in FIGS. 1 through 10 are not intended to limit the scope of the present disclosure. In other words, all of components or operations shown in FIGS. 1 to 10 should not be construed to be essential components for implementation of the present disclosure, and even though only some data units, operations or components are included, the present disclosure may be implemented without departing from the scope and spirit of the disclosure.

The above-described operations may be realized by equipping a memory device retaining their corresponding codes in the base station of the communication system or any component of the terminal. That is, the controller of the base station or the terminal carries out the above described operations by reading and executing the program code stored in the memory device by means of a processor or a central processing unit (CPU).

As described herein, various components or modules in the base station or the terminal may be operated using a hardware circuit, e.g., a complementary metal oxide semiconductor-based logic circuit, firmware, software, and/or using a hardware circuit such as a combination of hardware, firmware, and/or software embedded in a machine-readable medium. For example, various electric configurations and methods may be carried out by using electric circuits such as transistors, logic gates, and an application specific integrated circuit (ASIC).

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A method for controlling interference measurement by an interference measurement control device, the method comprising:
   calculating distance information between a transmission side that transmits a reference signal (RS) for interference measurement and a reception side that receives the RS;
   calculating signal delay information related to a delay time taken for the RS signal transmitted from the transmission side to arrive at the reception side, based on the distance information;
   determining control information regarding the transmission side or the reception side based on the signal delay information; and
   transmitting the control information to the reception side,
   wherein the control information comprises information about a measurement window of the reception side.

2. The method of claim 1, further comprising:
   determining RS allocation information,
   wherein the RS allocation information comprises one or more information among information about the transmission side that transmits the RS for interference measurement, information about the reception side that receives the RS, transmission time information of the RS, and transmission direction information of the RS.

3. The method of claim 1, wherein the distance information is calculated based on location information of the transmission side and location information of the reception side.

4. The method of claim 3, wherein when the transmission side or the reception side is a base station, the location information of the transmission side or the location information of the reception side is calculated by calculating location information of the base station from previously stored location coordinates data or receiving location coordinates of the base station from the base station.

5. The method of claim 3, wherein when the transmission side or the reception side is a terminal, the location information of the transmission side or the location information of the reception side is calculated based on at least one of global positioning system (GPS) information for the terminal, a positioning RS, beam information, timing advance (TA) information, or TA information of neighboring cells.

6. The method of claim 1, wherein the signal delay information is calculated based on uplink (UL) TA information of the transmission side.

7. A method for performing interference measurement by a base station, the method comprising:
   calculating distance information between a transmission side that transmits a reference signal (RS) for interference measurement and the base station that receives the RS;
   calculating signal delay information related to a delay time taken for the RS signal transmitted from the transmission side to arrive at the base station, based on the distance information;
   determining control information regarding the base station based on the signal delay information;
   receiving the RS from the transmission side; and
   performing interference measurement by measuring the received RS based on the control information,
   wherein the control information comprises information about a measurement window of the base station.

8. A method for performing interference measurement by a terminal, the method comprising:
   receiving control information comprising information about a measurement window of the terminal;
   receiving a reference signal (RS) from a transmission side;
   performing interference measurement by measuring the received RS based on the control information; and
   transmitting a result of the performed interference measurement,
   wherein the control information is determined based on signal delay information related to a delay time taken for the RS signal transmitted from the transmission side to arrive at the terminal, and
   wherein the signal delay information is calculated based on distance information between the transmission side and the terminal.

9. An interference measurement control device comprising:

a transceiver; and a processor configured to calculate distance information between a transmission side that transmits a reference signal (RS) for interference measurement and a reception side that receives the RS, calculate signal delay information related to a delay time taken for the RS signal transmitted from the transmission side to arrive at the reception side, based on the distance information, determine control information regarding the transmission side or the reception side based on the signal delay information, and transmit the control information to the reception side, wherein the control information comprises information about a measurement window of the reception side.

10. The interference measurement control device of claim 9, wherein the processor is further configured to:

determine RS allocation information, wherein the RS allocation information comprises one or more information among information about the transmission side that transmits the RS for interference measurement, information about the reception side that receives the RS, transmission time information of the RS, and transmission direction information of the RS.

11. The interference measurement control device of claim 9, wherein the distance information is calculated based on location information of the transmission side and location information of the reception side.

12. The interference measurement control device of claim 11, wherein when the transmission side or the reception side is a base station, the location information of the transmission side or the location information of the reception side is calculated by calculating location information of the base station from previously stored location coordinates data or receiving location coordinates of the base station from the base station.

13. The interference measurement control device of claim 9, wherein the signal delay information is calculated based on uplink (UL) TA information of the transmission side.

14. The interference measurement control device of claim 9, wherein the processor is further configured to control the transceiver to transmit the control information to the transmission side or the reception side.

15. A base station comprising:

a transceiver; and a processor configured to calculate distance information between a transmission side that transmits a reference signal (RS) for interference measurement and the base station that receives the RS, calculate signal delay information related to a delay time taken for the RS signal transmitted from the transmission side to arrive at the base station, based on the distance information, determine control information regarding the base station based on the signal delay information, receive the RS from the transmission side, and perform interference measurement by measuring the received RS based on the control information, wherein the control information comprises information about a measurement window of the base station.

16. A terminal comprising:

a transceiver; and a processor configured to receive control information comprising information about a measurement window of the terminal, receive a reference signal (RS) from a transmission side, perform interference measurement by measuring the received RS based on the control information, and transmit a result of the performed interference measurement, wherein the control information is determined based on signal delay information related to a delay time taken for the RS signal transmitted from the transmission side to arrive at the base station, and wherein the signal delay information is calculated based on distance information between the transmission side and the terminal.

* * * * *